United States Patent [19]

Billiu

[11] Patent Number: 5,034,181
[45] Date of Patent: Jul. 23, 1991

[54] APPARATUS FOR AND METHOD OF MANUFACTURING PREFORMS

[75] Inventor: Charles R. Billiu, Mt. Clemens, Mich.

[73] Assignee: Process First, Inc., Mt. Clemens, Mich.

[21] Appl. No.: 413,463

[22] Filed: Sep. 27, 1989

[51] Int. Cl.$^5$ ...................... B29C 39/42; B29C 41/50
[52] U.S. Cl. .................... 264/517; 264/257; 264/102; 425/80.1; 425/91; 425/504; 425/135; 425/138; 425/388; 65/4.4
[58] Field of Search ............... 264/257, 258, 517, 518, 264/102, 40.1, 121, 40.7; 425/81.1, 80.1, 82.1, 83.1, 91, 140, 135, 141, 138, 144, 504, 148, 388; 65/4.4, 9

[56] References Cited

U.S. PATENT DOCUMENTS

| | | | |
|---|---|---|---|
| 2,357,392 | 9/1944 | Francis | 264/517 |
| 3,170,197 | 2/1965 | Brenner | 65/4.4 |
| 3,669,638 | 6/1972 | Wong | 65/4.4 |
| 3,833,698 | 9/1974 | Wiltshire | 264/517 |
| 3,962,753 | 6/1976 | Dunn | 264/517 |
| 4,592,769 | 6/1986 | Lemaignen | 65/9 |
| 4,615,717 | 10/1986 | Neubauer | 65/4.4 |
| 4,812,283 | 3/1989 | Farley | 264/517 |

Primary Examiner—Jay H. Woo
Assistant Examiner—Jeremiah F. Durkin
Attorney, Agent, or Firm—Weintraub, DuRoss & Brady

[57] ABSTRACT

A method and apparatus for manufacturing fiber preforms includes a relatively small motor which is able to power a large fan because the fan is kept in a partial vacuum condition. A duct connects a fan housing to a vacuum box which has an air flow opening therein of relatively narrow width. A shuttle member is horizontally translatable above the vacuum box on a support bed and the shuttle member is divided into air flow channels by baffle plates. Only a small number of air flow channels can pass above the air flow opening at a single time and this serves to keep low pressure in the vacuum box. In addition, a vortex gate is provided in the duct between the fan housing and the vacuum box and serves to restrict air flow through the duct when the pressure within the duct drops below a certain level.

13 Claims, 4 Drawing Sheets

APPARATUS FOR AND METHOD OF MANUFACTURING PREFORMS

BACKGROUND OF THE INVENTION

1. Field of the Invention

The present invention relates to a method of manufacturing preforms, and to an apparatus for use in manufacturing preforms. More particularly, the present invention relates to an apparatus which includes a horizontally translatable shuttle member on which a foraminous mold is placed in a manufacturing process.

2. Description of the Prior Art

The formation of preforms from chopped fiber materials such as glass fibers, in the formation of fiber reinforced plastics, is a known art. However, existing apparatus for use in forming fiber directed preforms suffer from several drawbacks.

In the past, preforms were generally prepared by placing a screen, configured to the desired shape of a preform to be produced, on a rotary device having a fan behind it. The fan was used to draw air through the screen and to create a vacuum to draw material onto the screen. Usually, a mixture of glass fibers and bonding material to hold the fibers together was sprayed onto the screen and accumulated thereon through the action of the fan. After the preform is made it is placed in an oven to affix the glass fiber particles together in order to permanently retain the preform in the shape of the screen. The preform is then removed from the screen, trimmed, and is placed in a hollow mold. A resin is then injected into the mold and surrounds the fiber particles to create a finished article.

A review of some current developments in the preform manufacturing industry is given in the January 1989 issue of PPG Industries' Reinforcement Digest on pages 18–21.

A brief review of some patents in the field of fiber preforms and related arts follows.

Hampshire U.S. Pat. No. 2,929,436 discloses a method and apparatus for spraying a mixture of fibers and resin material onto a screen which has a vacuum applied behind it to draw the fiber onto the screen. In the apparatus of Hampshire, three separate conduits allow for transport of fibers, liquid resin bonding material, and compressed air to direct the flow of the fiber material from the gun. The area to which the vacuum must be applied in the apparatus of Hampshire is quite large, and the gun thereof must be manually held and sprayed by an operator. Moreover, the screen mold is mounted vertically on a wall panel and thus gravity may be a problem in the application of the fibers to the screen in this apparatus. The wire mold remains in a fixed position throughout the application of the fibers and resin thereto in the apparatus of Hampshire.

Roscher et al., U.S. Pat. No. 3,328,383 discloses a process for making glass fiber mats. In the method of Roscher, substantially brittle thermoplastic synthetic resin filaments are formed and mixed with glass fiber filaments, the fibers and filaments being chopped and dispersed together into a glass mat or preform. In the apparatus of Roscher, a conveyor screen moves the mat along and the mat is compressed by rollers as it moves along the conveyor screen.

Hall U.S. Pat. No. 3,908,591 discloses an adjustable apparatus for applying a flowable binder to sheet material such as a glass fiber mat. The disclosure of Hall is directed to the high volume production of relatively flat sheets of material to be bound such as glass fiber mat.

Palmer et al., U.S. Pat. No. 4,379,798 discloses a three-dimensional woven reinforcement containing both graphite fibers and glass fiber layers. The woven assembly of Palmer is impregnated with a resin such as epoxy to form a structural component such as I-beam or the like to be used as a lightweight component in construction or a similar use.

Layden U.S. Pat. No. 4,412,854 discloses a method of producing fiber reinforced articles in which sheets of fiber reinforcement are impregnated with a layer of thermoplastic binder, dried and cut into preformed shapes. These are stacked in a mold and warm molded to form an intermediate article, and the intermediate article is then hot pressed in a mold to form a final article.

Generally in forming fiber preforms from glass fiber roving in the prior art, the speed of manufacturing preforms was quite limited by the use of only a single screen mold. Varied thickness within a single preform is very hard to obtain with the prior art devices. Often, the screen on which the fibers are being sprayed is rotated in the prior art, which creates stratified layers of fibers which may separate after the article is completed.

Although the prior art includes various methods of making fiber mats and preforms, a need still exists in the industry for a preform manufacturing apparatus which is simple and relatively inexpensive to manufacture and to operate. Moreover, a need also exists for a preform manufacturing apparatus which can vary the thickness within a single preform according to particular needs.

SUMMARY OF THE INVENTION

The present invention provides an apparatus for manufacturing fiber preforms which is capable of automated operation and is capable of higher volume manufacturing then was available in the prior art. A particularly advantageous feature of the present invention is the use of a baffled shuttle member for directing air flow only to the area in which it is needed in order to allow use of a substantially lower horsepower motor than was possible in the prior art devices. The length of the preform does not affect the required horsepower of the blower motor with the present invention.

An apparatus in accordance with the present invention, generally, comprises:

(a) a support bed for supporting a shuttle member and comprising an upper surface with a substantially planar air flow opening formed therein;

(b) means for lowering the air pressure in the vicinity of the air flow opening;

(c) a shuttle member movably supported on the support bed for supporting a foraminous mold thereon, the shuttle member comprising;

(1) a peripheral frame having a height; and (2) at least one baffle plate disposed in the frame and affixed thereto to define an air channel on each side thereof;

(d) means for horizontally translating the shuttle member on the support bed;

(e) at least one fiber dispensing nozzle disposed above the support bed for depositing a fiber medium on a foraminous mold to define a preform; and (f) a control unit to coordinate operation of the apparatus.

Further detail regarding the present invention may be found in the detailed description section, which should

DETAILED DESCRIPTION

Figure 1:
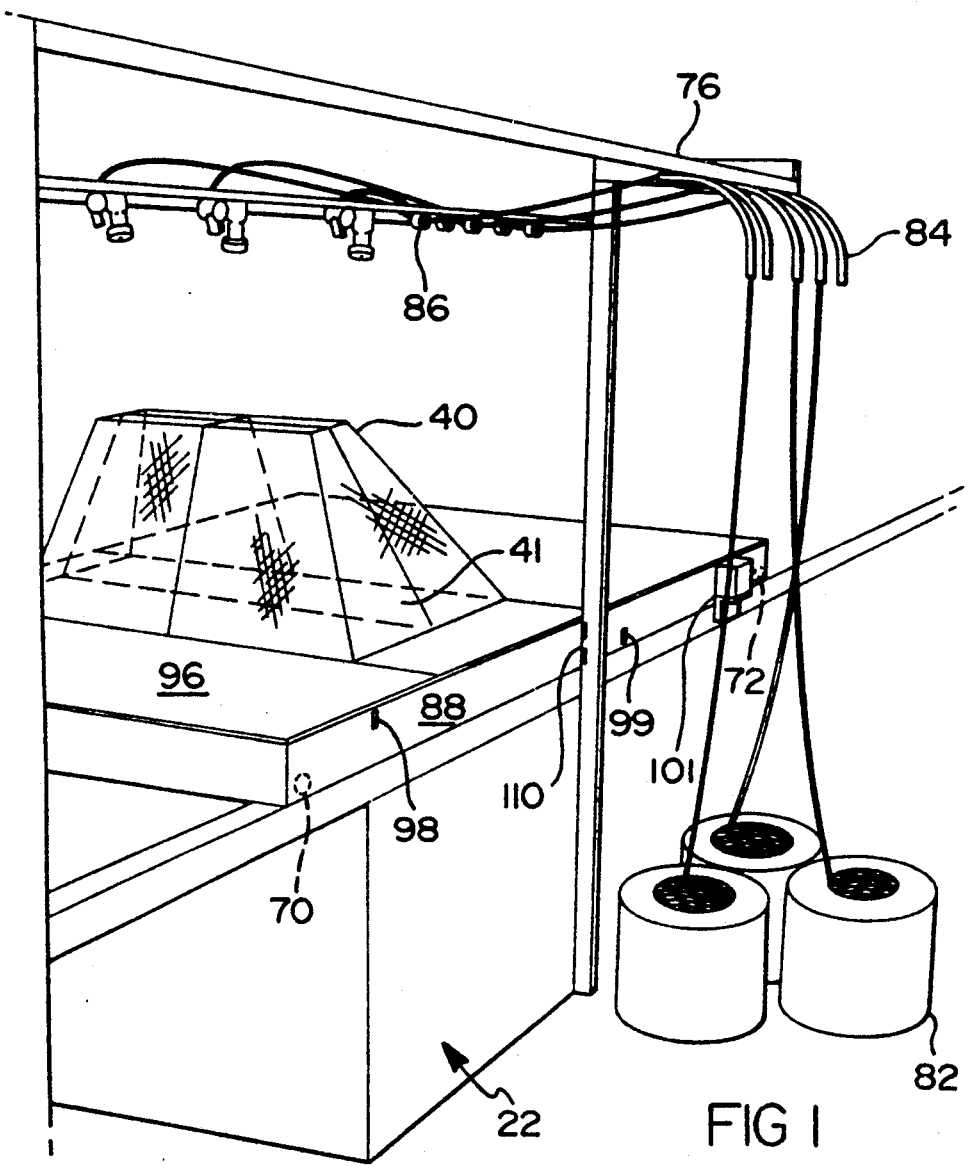
FIG. 1 is a perspective view of a first embodiment of an apparatus in accordance with the present invention.
Figure 2:
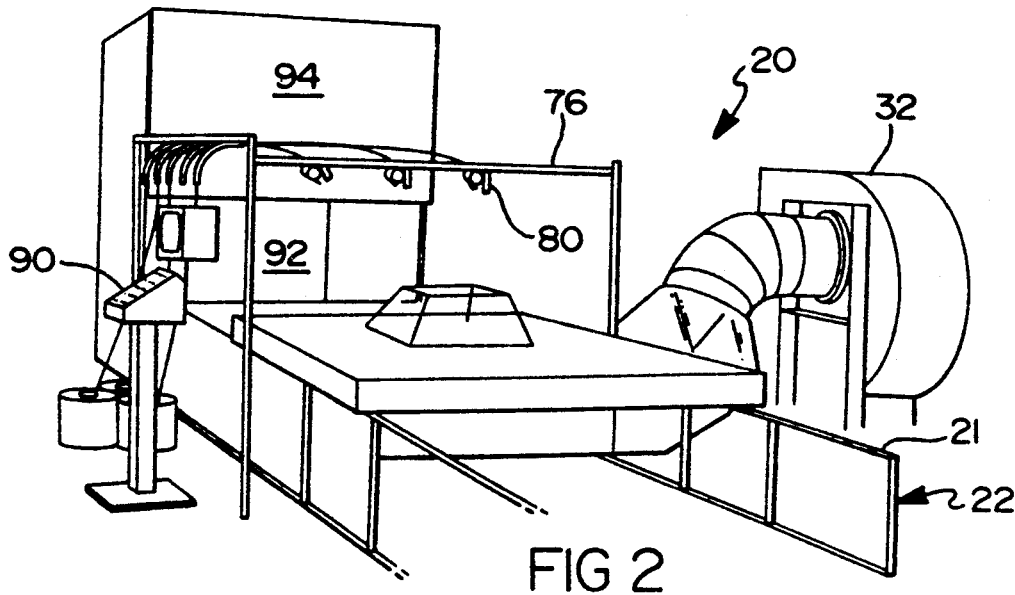
FIG. 2 is a three-quarter perspective view showing the front end of the apparatus of FIG. 1.
Figure 3:
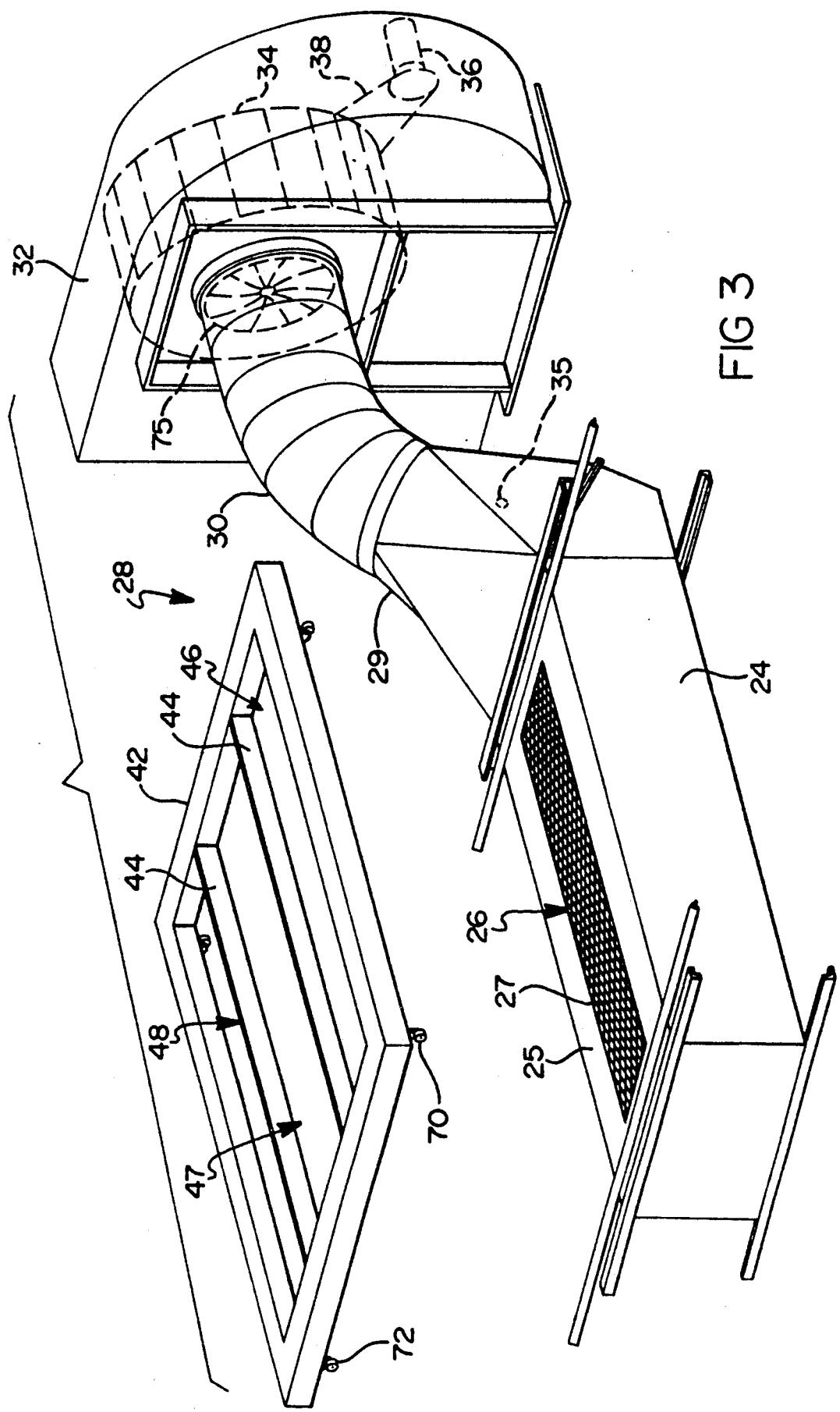
FIG. 3 is an exploded perspective view showing the internal structure of the shuttle member and showing part of the support bed with the air flow opening formed therein.

Referring now to FIGS. 1-3, a first embodiment of an apparatus in accordance with the present invention is shown generally at 20 and includes a generally rectangular support bed 22 for supporting a shuttle member 28 thereon. The support bed 22 includes a frame 21 and also a vacuum box 24 with an upper surface 25 having a substantially planar air flow opening 26 formed therein. The support bed 22 could optionally be formed of solid plates (not shown), or other suitable materials, so long as it serves to support the shuttle member 28 thereon and includes an air flow opening 26. The support bed 22 provides a foundation for supporting the movable shuttle member 28 for horizontal translation thereof as will be further described herein. The vacuum box 24 is a generally closed hollow box, having openings only at the air flow opening 26 in the upper surface thereof, and at an end portion 29 thereof to allow communication through a duct 30 with a fan 34. The air flow opening 26 may optionally have a screen plate 27 disposed therein to prevent passage therethrough of solid objects. A hollow duct 30 connects the vacuum box 24 to a fan housing 32. Disposed within the housing 32 is a fan 34 which is powered by a blower motor 36 via a fan belt 38 in known fashion. The fan 34 may be a cylindrical "paddle wheel" type as shown or may be another type of fan suitable for moving air through the duct 30. The fan 34 when operated by the motor 36 acts in cooperation with the fan housing 32, the duct 30 and the vacuum box 24 to provide a means for lowering the air pressure in the vicinity of the air flow opening 26. Thus, a partial vacuum is created and maintained within the fan housing 32, the duct 30, and the vacuum box 24 at all times when the motor 36 is on. Other appropriate means of lowering the air pressure within the vacuum box 24 and in the vicinity of the air flow opening 26 could be used, such as alternative fanning or air flow arrangements known to those skilled in the art.

A shuttle member 28 is movably supported on the support bed 22 and serves to support a foraminous mold 40 thereon. As used herein, foraminous means characterized by having a multiplicity of holes or perforations formed therethrough. The mold 40 may be formed of wire screen, or may be metal or plastic with holes formed therethrough. The shuttle member 28 is important to the practice of the present invention because it serves to limit the area to which a low pressure must be applied, and thus allows a partial vacuum to be continuously maintained at the fan 34, which in turn allows for the use of a lower horsepower motor 36 than was possible with the prior art. This provides great cost savings both in initial capital investment and in operating costs.

The shuttle member 28 comprises a generally rectangular peripheral frame 42 having a height sufficient to create air passages therethrough as will be described in further detail herein. One or more baffle plates 44 are generally vertically disposed in the frame 42 and affixed thereto to define vertical air channels such as those shown at 46, 47, 48 through the shuttle member 28 on each side of the baffle plates 44. The baffle plates 44 are generally of the same height as the frame 42 so that the air channels 46, 47, 48 may be partially sealed off. In the embodiment of FIG. 3, two baffle plates are provided in the shuttle member 28. However, any number of baffle plates 44 may be used, depending on the desired length of the shuttle member 28. Each of the vertical air channels 46, 47, 48 is alignable with the air flow opening 26 to allow for lowering the air pressure only in a defined and limited area above the air flow opening 26. The width of each air channel 46, 47, 48 is approximately the same as or narrower than the width of the air flow opening 26 to limit the area which is exposed to low pressure. The width of each air channel 46, 47, 48 is a function of available fan motor (36) HP and the air flow restriction provided by the chopped fiber being collected. For example, if the width of the airflow opening 26 is 18" and the width of each air channel 46, 47, 48 is 12", then a maximum of 24" of air intake is exposed to the airflow opening 26 at a given time. Thus, a preform of any length may be manufactured without requiring an increase in the horsepower of the motor 36.

A variable vortex gate 75 is disposed within the duct 30 where it joins the housing 32. The vortex gate 75 is an iris-type diaphragm similar to that used in a camera lens, and is actuated by a pneumatic cylinder (not shown). The vortex gate 75 is provided in order to restrict air flow through the duct 30, at such time as either the pressure in the duct rises above a certain pre-determined level, or the position of the shuttle is such that the airflow opening is not covered thereby, in order to protect the blower motor 36. A pressure sensor 35 may be provided in the vacuum box 24 in electronic communication with a control unit 90 which coordinates the operation of the apparatus 20. This coordinated use of the vortex gate 75 allows for the use of a motor of a size which would have difficulty turning the fan 34 at full atmospheric pressure, but which can easily turn the fan 34 in a continuous partial vacuum.

Figure 4:
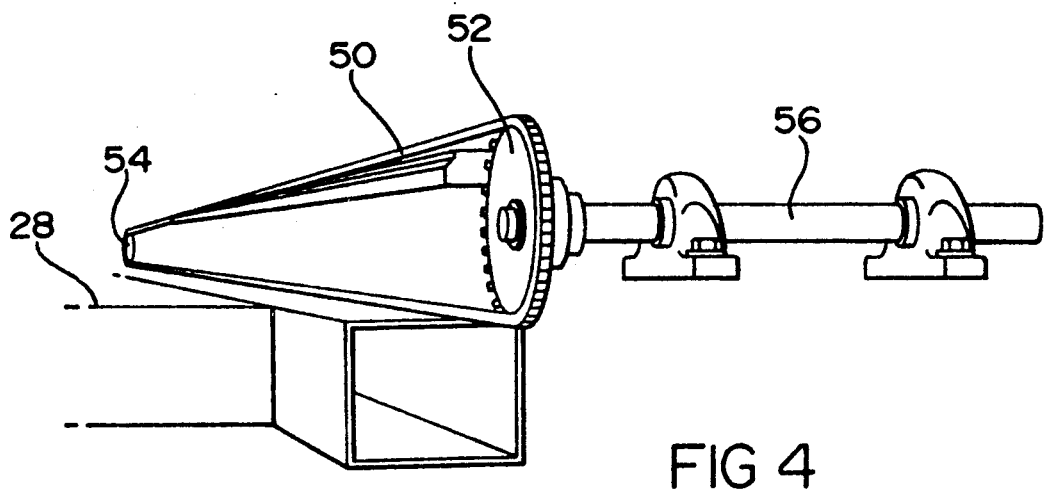
FIG. 4 is an end perspective view of a drive mechanism for moving the shuttle member of the present invention.
Figure 5:
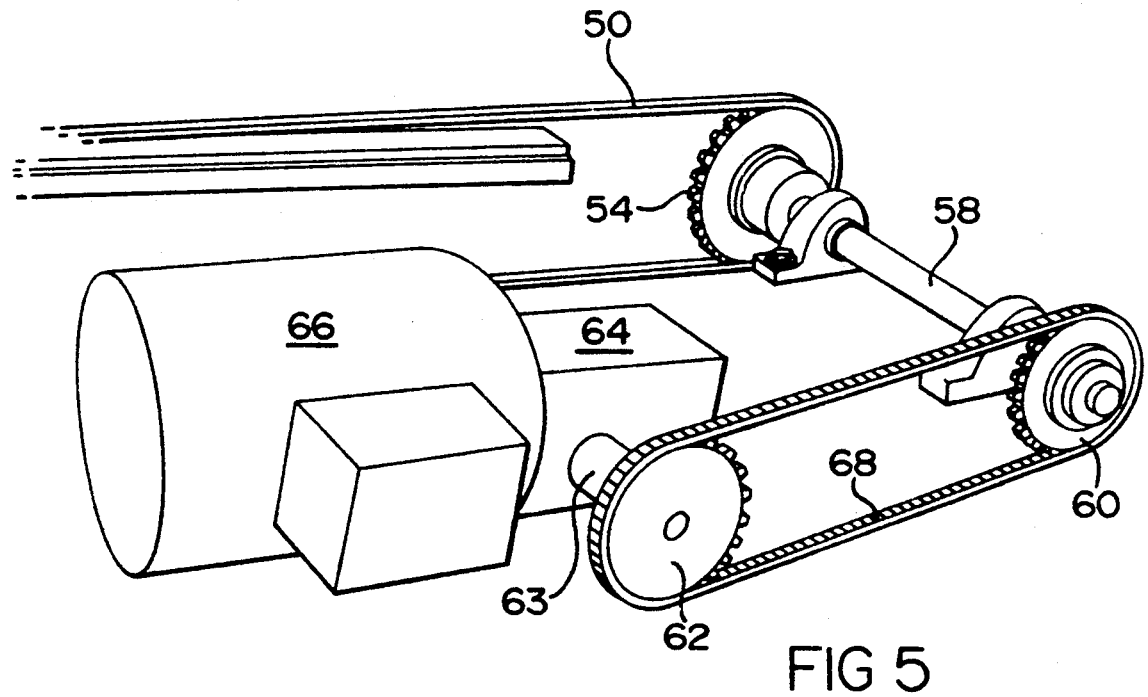
FIG. 5 is a perspective view of another section of the drive mechanism of FIG. 4 showing the drive motor thereof.

Referring now to FIGS. 4 and 5 it may be seen that in the first depicted embodiment, a drive chain 50 is welded, clamped or otherwise attached to the shuttle member 28, and extends around a first pulley 52 and a second pulley 54. The chain 50 forms a loop. Each of the first and second pulleys 52, 54 is fixedly attached to shafts 56, 58 respectively, which are in turn rotatably mounted to the support bed 22. The end of the rear shaft 58 opposite the second pulley 54 has a third pulley 60 fixedly mounted thereon. A fourth pulley 62 is mounted on a third rotatable shaft 63 which is connected by a gear box 64 to a variable speed motor 66. A second chain loop 68 joins the third and fourth pulleys 60, 62 together. The variable speed motor 66, acting in conjunction with the pulleys 52, 54, 60, 62, and chains 50, 68 provides a means for horizontally translating the shuttle member 28 on the support bed 22 at a controlled and variable speed. The shuttle member 28 may have rotatable bushings as shown at 70, 72, attached thereto to allow for slidable movement of the shuttle member on the support bed 22. Alternatively, equivalent arrangements such as installing rotatable wheels or bushings in the support bed 20, to allow movement of the shuttle member 28 thereon, would be equally efficacious in the practice of the present invention.

A support rack 76 is provided above the support bed 22 and serves as a mounting surface for a plurality of fiber chopping and dispensing nozzles 80. As seen in FIG. 2, the nozzles 80 are disposed vertically above the support bed 22. Suitable fiber chopping and dispensing nozzles are available commercially from, e.g. Glass-Craft, Inc. at 5485 W. 82nd Street in Indianapolis, Ind. Fibers to be dispensed from the nozzles 80 are fed from spools 82 through one or more strand guides 84, 86 and from there to the dispensing nozzles 80. A binder is also provided to the nozzles 80 for fusing the chopped fiber pieces together on the mold 40 to define a preform.

Operation of the apparatus 20 is coordinated by a control unit 90 which may include a microprocessor. In one embodiment, the dispenser nozzles 80 are movable in a direction transverse to motion of the shuttle member by servo motors or the like to lay down a continuous strand rather than a chopped strand for a particular type of preform. The foraminous mold 40 is formed in the desired shape of the preform and may have one or more solid vertical baffles 41 therein to allow alignment of the mold baffles 41 with the baffle plates 44 in the shuttle member to further limit air flow through the air opening 26. The mold 40 also includes a solid portion 96 to cover the air passages that are not needed for a particular preform, and thus to limit airflow through the shuttle 28.

A curing chamber 92 may be provided proximate the support bed 22 for curing preforms therein. The curing chamber 92 may be an oven, or may use other types of energy to cure preforms. In the embodiment of FIGS. 1-5, the shuttle member 28 is partially movable into the curing chamber 92 and an oven door 94 is movable downwardly to seal off the curing chamber 92 from the external environment for curing therein of a preform. As is conventional in the preform manufacturing art, and is will be appreciated by those skilled in the art, the fibers themselves may be coated with a resin binder which acts to bond the chopped fibers together during the curing operation, or alternatively, the chopped fibers may be sprayed with a liquid binder from the nozzles 80 as they are dispensed onto the mold, the liquid containing a resin which bonds the fibers together during the curing operation.

Another novel feature of the present invention is in the use of position indicators 98, 99 on an outside surface 88 of the shuttle member 28. These position indicators 98, 99 cooperate with a position sensor unit 110 mounted on the support frame 76 to send signals to the control unit 90 indicating the position of the shuttle member 28 to initiate and terminate spraying of the fiber and the binder onto the screen mold 40. In addition, when the control unit 90 senses the position of the shuttle member 28, and begins spraying of the fiber, the speed of travel of the shuttle member may be slowed or varied by the variable speed motor 66 which controls horizontal translation thereof. This may allow for variable thickness of application of fiber in the preform. The support bed 22 may have a second position sensor unit 101 mounted thereon to provide backup data to the control unit 90.

Figure 6:
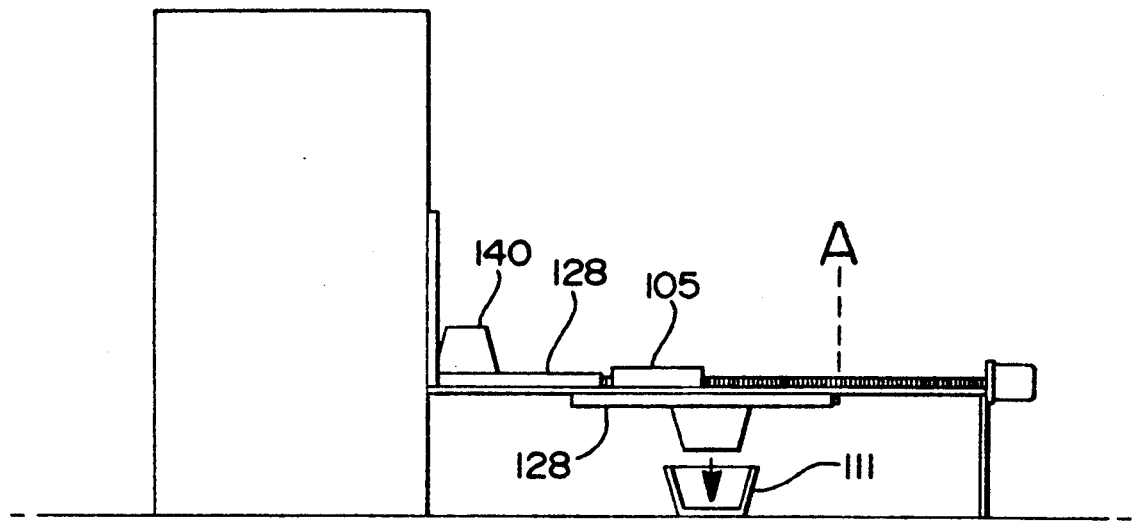
FIG. 6 is a side elevational view of a second embodiment in accordance with the present invention.
Figure 7:
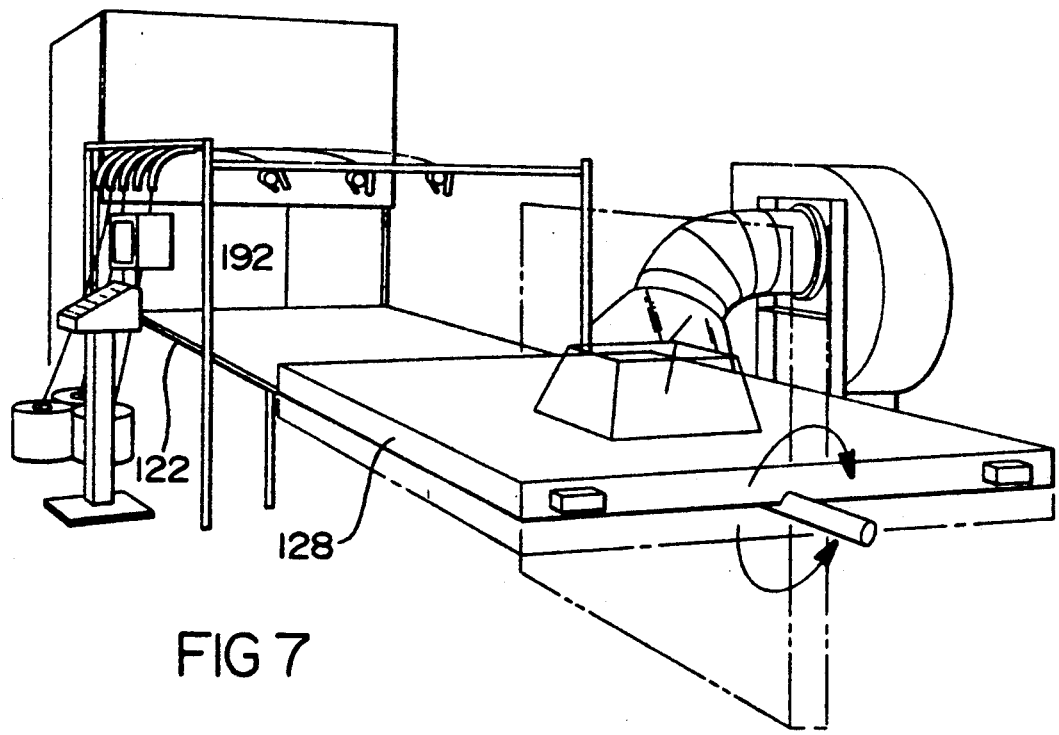
FIG. 7 is a perspective view of the embodiment of FIG. 6.

Referring now to FIGS. 6 and 7, in a second embodiment hereof, at a point of travel furthest from the curing chamber 192, the shuttle member 128 may be rotated about its own longitudinal axis to allow removal therefrom of a first preform, in the beginning of a cycle, to allow manufacture of a second preform immediately thereafter. The rotation of the shuttle member may be manual or may be motorized. As illustrated in FIG. 6, the apparatus in this embodiment may include two shuttle members 128. A tractor mechanism 105 disengagably connects to the upper shuttle member 128 by electromagnets or other suitable coupling means known to those in the art. The tractor 105 moves the upper shuttle member 128 along the support bed and the chopped fiber is sprayed on the mold 140 and is cured in the curing chamber 192 to form a finished preform 111. The tractor 105 then moves the upper shuttle to point "A" as shown in FIG. 6. At this point, both shuttle members 128 are aligned and are rotated together as shown by the arrow in FIG. 7. The upper shuttle 128 then becomes the lower shuttle and the new upper shuttle is able to immediately begin the cycle moving away down the support bed 122 while the finished preform 111 is removed from the lower shuttle by an operator (not shown).

The present invention also encompasses a method of manufacturing a fiber preform, including a step of placing a foraminous mold 40 formed in a desired shape of a preform on a shuttle member 28, the shuttle member 28 having at least one baffle plate 44 therein to define a vertical air flow channel 46, 47 on each side thereof. The shuttle member 28 is then horizontally translated by the variable speed motor 66 acting through the chains 50, 68 to align a first air flow channel 48 with the air flow opening 26 in the vacuum box 24 within the support bed 22. During the time the shuttle 28 is being horizontally translated, the blower motor 36 spins the fan 34 to create a low pressure condition in the vicinity of the air flow opening 26. This also lowers the pressure within the first air flow channel 48 when it becomes aligned with the air flow opening 26, and in turn, pulls air into and through the mold 40.

Once the first air flow channel 48 is aligned with the air flow opening 26, position sensors 110 send a signal to the control unit 90 and a fiber medium and binder is then deposited on the exterior of the mold 40 in the area thereof above the first air flow channel 48.

The shuttle is then further horizontally translated to align a second air flow channel 47 with the air flow opening 26 and thus create a partial vacuum or low pressure area in the area of the mold 40 which is above the second air flow channel 47. The fiber medium and binder is then sprayed on that portion of the mold 40 which is above the second air flow channel 47.

Following deposition of the fiber onto the mold in a desired thickness and arrangement, the shuttle member 28 is further horizontally translated to move the mold 40 into the curing chamber 92. The door 94 is then closed on the curing chamber and the fiber medium and binder is cured in place on the mold 40 to define a preform.

Although the present invention has been described herein with respect to specific embodiments thereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention, what is claimed is:

1. A method of manufacturing a fiber preform, comprising the steps of:
   (a) placing a foraminous mold formed in a desired shape of a preform on a shuttle member, the shuttle member having a peripheral frame with at least one baffle plate therein to define a vertical air flow channel within the frame on each side thereof;
   (b) horizontally translating the shuttle member to align a first air flow channel thereof with an air flow opening in a support bed;
   (c) activating a fan to create a low pressure condition in the vicinity of the air flow opening, wherein the area which is exposed to the low pressure is substantially limited by the baffle plate and frame of the shuttle member;
   (d) depositing a fiber medium and a binder on the mold in an area thereof above the first air flow channel;
   (e) further horizontally translating the shuttle member to align a second air flow channel with the air flow opening and depositing the fiber medium and binder on the mold in an area thereof above the second air flow channel;
   (f) further horizontally translating the shuttle member at least partially into a curing chamber and curing the fiber medium and binder on the mold to define a cured preform.

2. The method of claim 1, wherein the curing is accomplished by heating the preform.

3. An apparatus for use with a foraminous mold in manufacturing preforms comprising:
   (a) a support bed for supporting a shuttle member and comprising an upper surface with a substantially planar air flow opening formed therein;
   (b) means for lowering air pressure in the vicinity of the air flow opening;
   (c) a shuttle member movably supported on the support bed for supporting a foraminous mold thereon, the shuttle member comprising:
      (1) a peripheral frame having a height; and
      (2) at least one baffle plate disposed in the frame and affixed thereto to define a vertical air channel through the frame on each side thereof;
   (d) means for horizontally translating the shuttle member on the support bed;
   (e) at least one material dispensing nozzle disposed above the support bed for depositing material on a foraminous mold; and
   (f) a control unit to coordinate operation of the apparatus.

4. The apparatus of claim 3, further comprising: means for guiding a fiber strand to the nozzle.

5. The apparatus of claim 3, wherein the baffle plate has a height approximately equal to the height of the frame.

6. The apparatus of claim 3, wherein the translating means comprises a variable speed motor.

7. The apparatus of claim 3, wherein the control unit comprises a microprocessor.

8. The apparatus of claim 3, further comprising means operatively connected to the support bed for sensing the position of the shuttle, and means responsive to the position sensing means for initiating and terminating fiber flow from the nozzle, the flow initiating and terminating means being in electrical communication with the control unit and controlled thereby.

9. The apparatus of claim 3, wherein the shuttle member has a longitudinal axis about which it may be rotated to allow for quick removal of a preform therefrom.

10. The apparatus of claim 3, further comprising a screen mold which comprises at least one air guide plate alignable with the baffle plate of the shuttle to regulate air flow through the mold.

11. The apparatus of claim 3, further comprising:
   (a) a blower motor; and
   (b) means for restricting air flow to the blower motor to maintain a continuous partial vacuum while the blower motor is operative.

12. The apparatus of claim 3, further comprising a curing chamber disposed proximate the support bed for curing preforms.

13. The apparatus of claim 12, wherein the curing chamber comprises means for heating the preform.

* * * * *